Feb. 24, 1925.
W. NATHANSON ET AL
DIE FOR MAKING SEAMLESS TUBES
Filed April 7, 1924   8 Sheets-Sheet 1
1,527,266
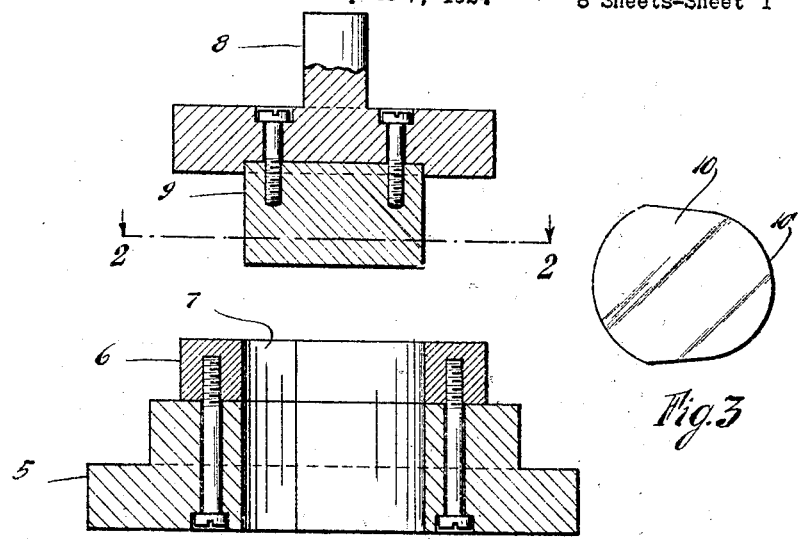
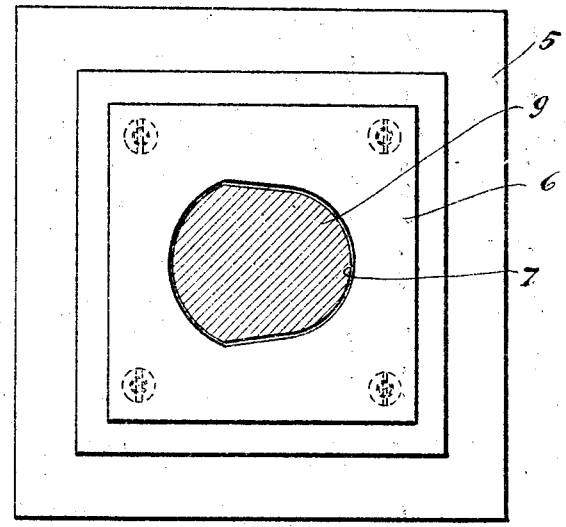
Witnesses:
Inventors:
William Nathanson &
Jack Behm
By Joshua R. H. Potk
Their Attorney.

Feb. 24, 1925. 1,527,266
W. NATHANSON ET AL
DIE FOR MAKING SEAMLESS TUBES
Filed April 7, 1924 8 Sheets-Sheet 2
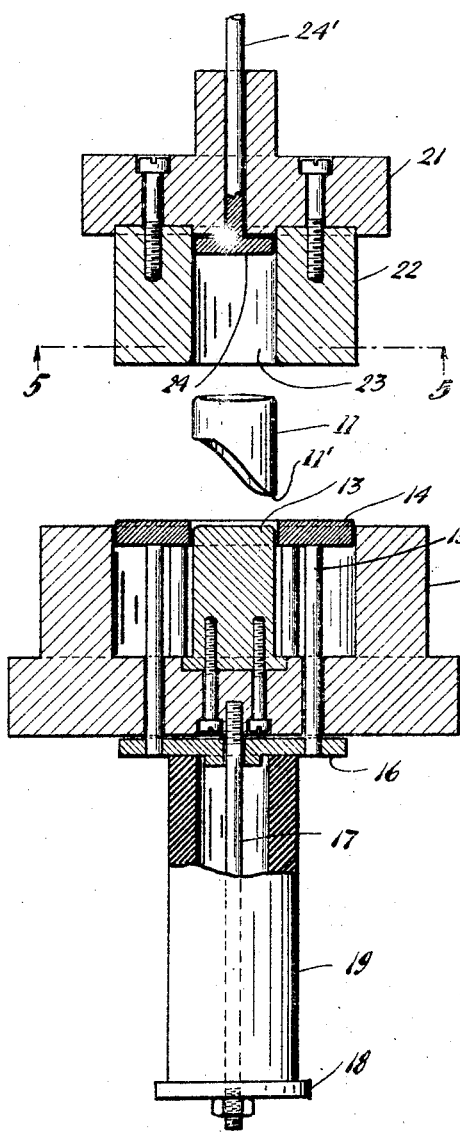
Fig. 4
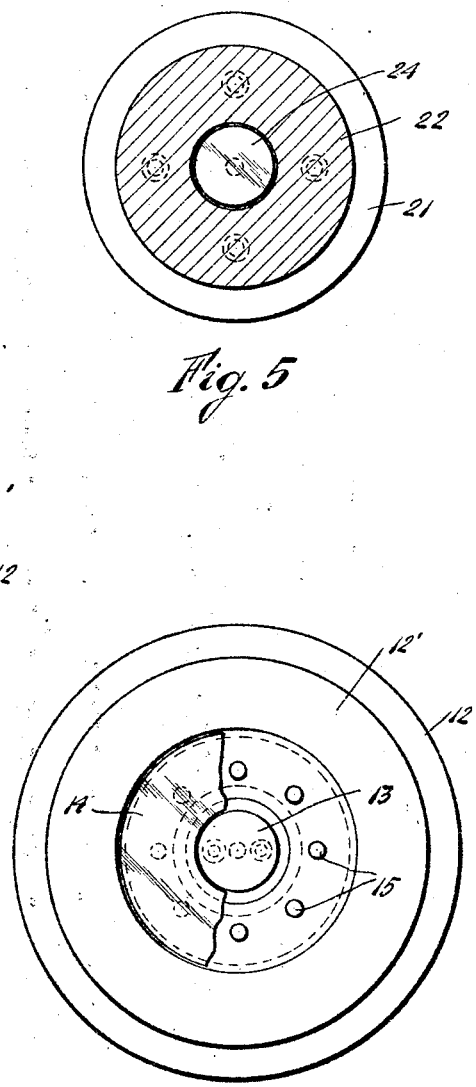
Fig. 5
Fig. 6
Inventors:
William Nathanson &
Jack Behm

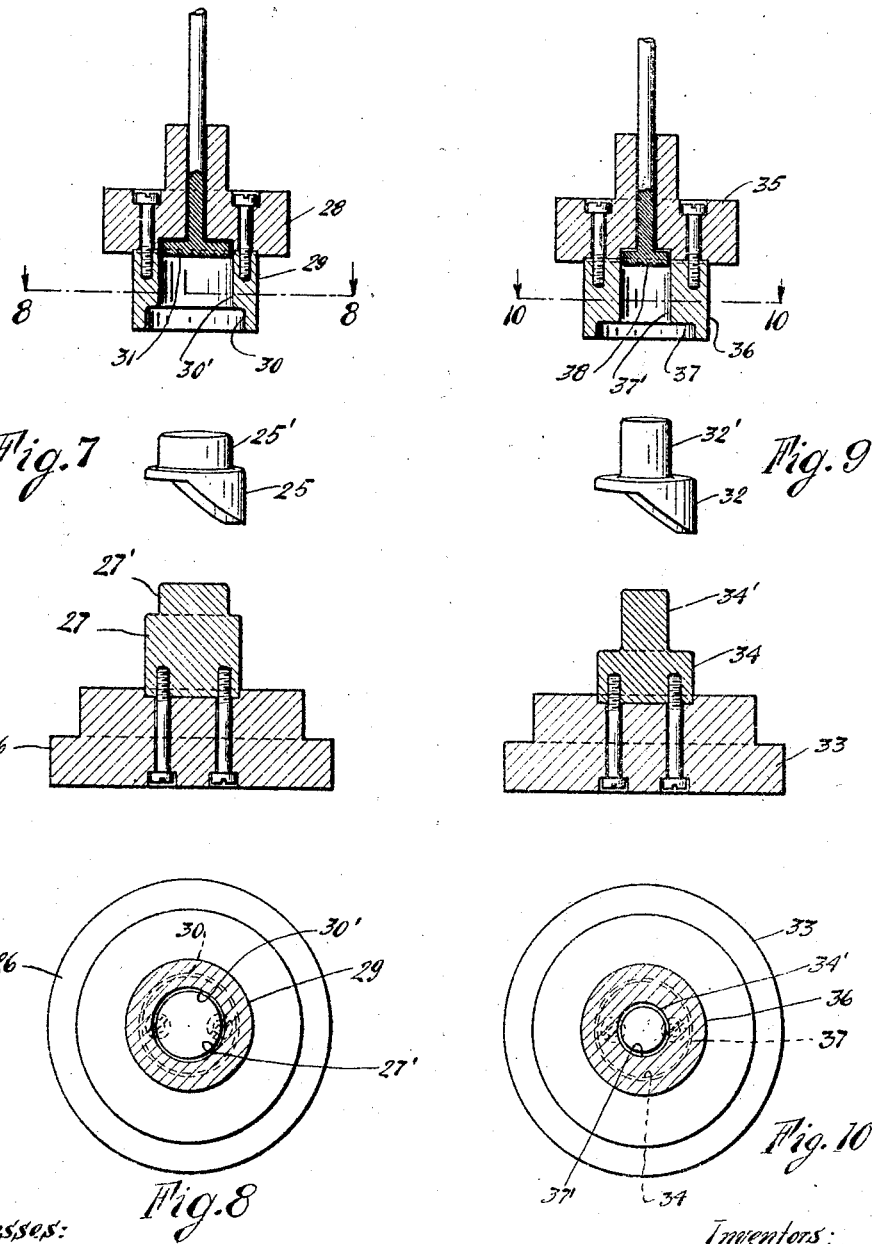

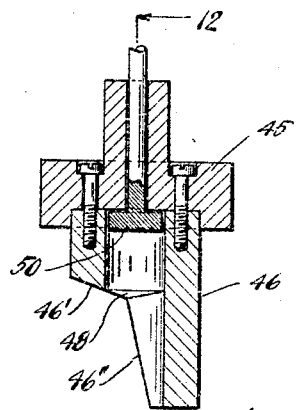
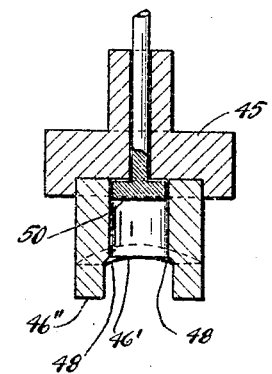
Fig.11
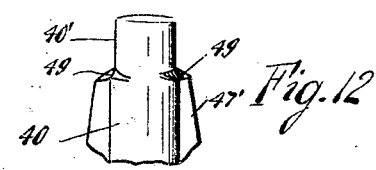
Fig.12
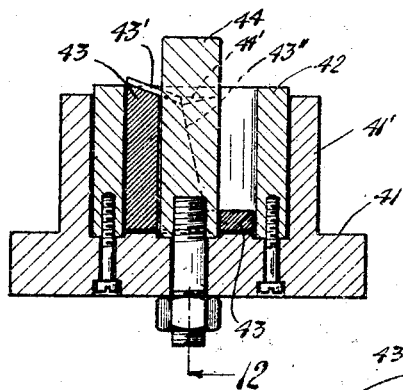
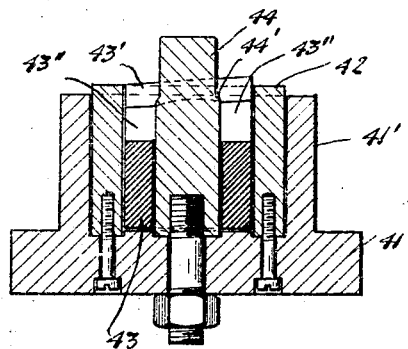
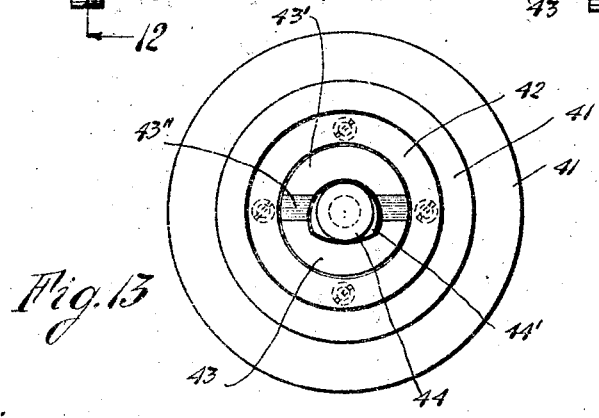
Fig.13

Feb. 24, 1925. 1,527,266
W. NATHANSON ET AL
DIE FOR MAKING SEAMLESS TUBES
Filed April 7, 1924 8 Sheets-Sheet 5

Witnesses:

Inventors
William Nathanson &
Jack Behm
By Joshua R H Potk
Their Attorney.

Feb. 24, 1925. 1,527,266
W. NATHANSON ET AL
DIE FOR MAKING SEAMLESS TUBES
Filed April 7, 1924   8 Sheets-Sheet 6

Witnesses:

Inventors:
William Nathanson &
Jack Behm
By Joshua R H Potk
Their Attorney.

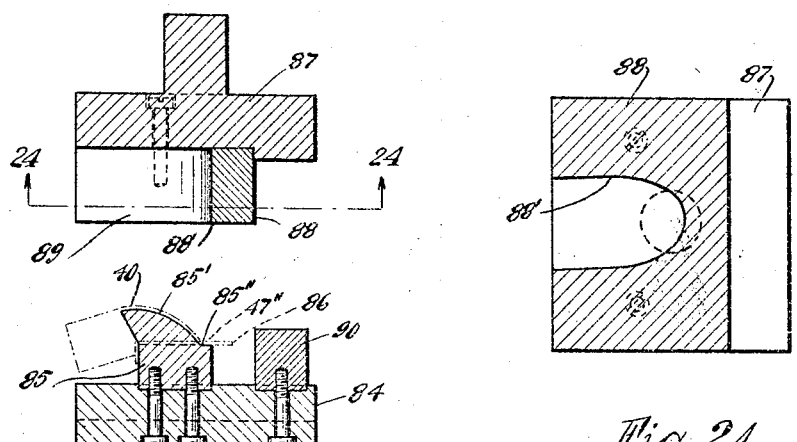

Patented Feb. 24, 1925.

1,527,266

UNITED STATES PATENT OFFICE.

WILLIAM NATHANSON AND JACK BEHM, OF CHICAGO, ILLINOIS, ASSIGNORS OF ONE-THIRD TO OTTO A. ZINKE, OF CHICAGO, ILLINOIS.

DIE FOR MAKING SEAMLESS TUBES.

Application filed April 7, 1924. Serial No. 704,710.

*To all whom it may concern:*

Be it known that we, WILLIAM NATHANSON and JACK BEHM, citizens of the United States, and residents of the city of Chicago, county of Cook, and State of Illinois, respectively, have invented certain new and useful Improvements in Dies for Making Seamless Tubes, of which the following is a specification.

Our invention pertains to dies for making seamless tubes; and the invention has for its principal object the provision of a set of dies for forming a seamless connector tube from a blank of sheet metal, and more particularly for drawing and forming from such blank a tube provided with flanges arranged to secure said tube to the lower corner of an automobile radiator.

Other objects will appear hereinafter.

The invention consists in the combinations and arrangements of parts hereinafter described and claimed.

The invention will be best understood by reference to the accompanying drawings forming a part of this specification, and in which,—

Fig. 1 shows a vertical sectional view of the die, including the upper movable member and the lower stationary member, used in cutting a blank of suitable shape from a strip of sheet metal;

Fig. 2 is a horizontal cross section of said die taken on line 2—2 of Fig. 1;

Fig. 3 is a view of the blank cut with the die shown in Fig. 1;

Fig. 4 shows a vertical sectional view of the die, including the upper movable and the lower stationary members, used in the next operation for forming the shell or cap shown between said members, from the blank shown in Fig. 3;

Fig. 5 is an inverted cross sectional view of the upper member taken on line 5—5 of Fig. 4;

Fig. 6 is a plan view of the lower member shown in Fig. 4;

Fig. 7 shows a vertical sectional view of the die used in the succeeding operation, including the upper and lower members and the product formed from the cap shown in Fig. 4;

Fig. 8 is a horizontal sectional view of the die taken on line 8—8 of Fig. 7;

Fig. 9 shows a vertical sectional view of the die, including the upper and lower members, used in the succeeding step for contracting and elongating the upper tubular portion of the product shown in Fig. 7.

Fig. 10 is a horizontal sectional view taken on line 10—10 of Fig. 9;

Fig. 11 shows a vertical sectional view of the die, including the upper and lower members, used in the following step for forming the product with the offset flanges, as shown between said members, from the product shown in Fig. 9;

Fig. 12 is a vertical sectional view taken on line 12—12 of Fig. 11;

Fig. 13 is a horizontal sectional view of the lower member of said die shown in Figs. 11 and 12;

Fig. 23 is a vertical sectional view of the die used in the succeeding step for trimming the flanges of the connector tube;

Fig. 24 is an inverted sectional view taken on line 24—24 of Fig. 23;

Fig. 25 is a plan view of the lower member of the die shown in Fig. 23;

Fig. 26 is a view of the connector tube before trimming the flange;

Fig. 27 is a view of the connector tube after the flange has been trimmed with the die shown in Fig. 23;

Figure 31:
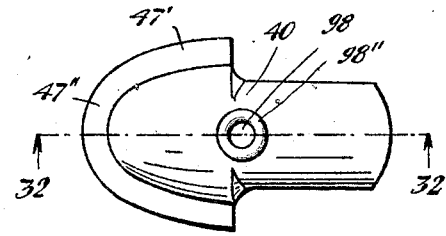
Fig. 31 is a view of the finished device produced by means of the above disclosed dies.
Figure 32:
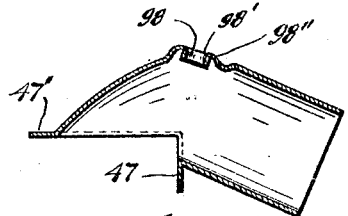
Fig. 32 is a sectional view taken on line 32—32 of Fig. 31.

In carrying our invention into effect we provide a set or series of dies for drawing a blank of sheet metal into shell shape and forming from the intermediate portion of the blank a closed tubular upper portion, and from the edge portion of the blank an extended lower portion, without cracking or wrinkling the metal of the blank; then forming flanges on the extended lower portion; providing an opening in the closed upper end of the tubular portion; and bending the flanged portion and flanges into shape for attaching the device to the water chamber of an automobile radiator. We preferably also provide dies for trimming the flanges, to produce the product shown in Fig. 27, and for forming a flanged drain outlet on the tube, as shown in Figs. 31 and 32. Various forms and numbers of dies may be used to produce the desired connector tube, but the preferred form includes the following dies used in the following successive order.

Fig. 1 of the drawing shows the die comprising the lower stationary member including the supporting member 5, mountable on the stationary jaw of a die pressed machine, and the die ring or cutting ring 6 secured to member 5 and provided with an opening 7 of the exact shape and size of the blank; and the upper or movable member including a stem 8, mountable on the movable jaw of the die press machine, and the die block 9 secured to member 8 and exactly fitting the opening 7 for cutting the blank 10 from a strip of sheet metal (as indicated in Fig. 3) to exact shape and size.

In Fig. 4 is shown the die for performing the drawing operation and shaping the blank 10 into a shell or cap 11 having a bevelled edge, the end 10′ of the blank 10 being drawn to form the lower extended end 11′ of said cap. This die comprises the lower stationary member including the base member 12 provided with an annular flange 12′, and a central post 13 fastened to member 12 in any suitable manner; also a ring 14 which is mounted to move with pins 15 in the annular space provided between post 13 and flange 12′, said pins 15 being secured to a disc 16 for moving the same longitudinally on a rod 17 threaded into the lower part of member 12. A disc 18 is mounted on the lower end of rod 17 by means of a suitable nut or the like, and a resilient post 19, of rubber or any suitable yieldable material, is mounted on rod 17 between discs 16 and 18. The upper movable member of this die includes a member 21 attachable to the movable jaw of the die press machine, and a cylindrical member 22 secured to member 21 and provided with an opening 23 closely fitting over post 13 of the stationary die member.

In forming the cap 11 with the above die the blank 10 is placed in proper position on ring 14 and after the upper die member descends the cylinder 22 engages the blank and gradually forces the outer ends thereof downward with the ring 14, pins 15, disc 16 and compressing the resilient post 19, thereby gradually and evenly drawing and expanding the outer or edge portion of blank 10 and forming the cap 11 as shown in Fig. 4. A plunger 24 with a stem 24′ is also provided for expelling the finished cap 11 from the opening 23.

The die used for the succeeding step is shown in Fig. 7 and comprises a lower stationary member including a base member 26 and a die block 27 secured thereto and provided with an upper neck portion 27′. The upper member of this die includes a mounting member 28 with a cylindrical sleeve 29 secured thereto and having an opening with an enlarged portion 30 and a contracted portion 30′ to fit respectively over the portions 27 and 27′ of the stationary die and to form the extended lower portion 25 and the contracted upper tubular portion 25′, as shown in said Fig. 7, from cap 11 shown in Fig. 4. A plunger 31 is also provided with a suitable stem to expel the finished cap or shell from the movable upper member.

The die for the following operation is shown in Fig. 9 and comprises a lower stationary member including a base member 33 with a die block 34 secured thereto and having an upper contracted neck portion 34′. The upper movable member of the die includes a member 35 attachable to the movable jaw of the die press machine and provided with a cylindrical member 36 having a central opening with an enlarged portion 37 and a contracted portion 37′ to form the expanded portion 32 and the contracted elongated portion 32′, as shown in Fig. 9, a plunger 38 is also provided in the movable member to expel the shell finished by this operation.

The die used in the succeeding operation further draws the extended lower portion 32 of the shell shown in Fig. 9, forming offset flanges thereon, and comprises a lower stationary member including a base member 41 provided with an upstanding cylindrical flange 41' and a cylindrical sleeve 42 secured to the base member within said flange 41. An irregular die sleeve 43 is mounted within sleeve 42 and is provided with an upper bevelled face 43' on its upper portion and a pair of downwardly slanting faces 43''. A stem 44 is mounted within sleeve 43 and is secured to the base member 41 with a bolt or suitable fastening means as shown. The upper movable member of the die includes a member 45 mountable on the movable jaw of the die press machine, and to which is secured a sleeve 46 having a bevelled face 46' and a pair of bevelled faces 46'' extending from face 46' to the lower end of member 46, said faces 46' and 46'' cooperating with the faces 43' and 43'' on the die sleeve 43, for forming the flanges 47 and 47' on the shell 40. Opposite bevelled shoulders 48 are also provided on die sleeve 46 and correspond with the bevelled shoulders 44' on stem 44 to form bevelled or gradually sloping shoulders 49 on the shell. A plunger 50 is slidably mounted in the central opening formed in die sleeve 46 for expelling the finished shell therefrom.

Figure 14:
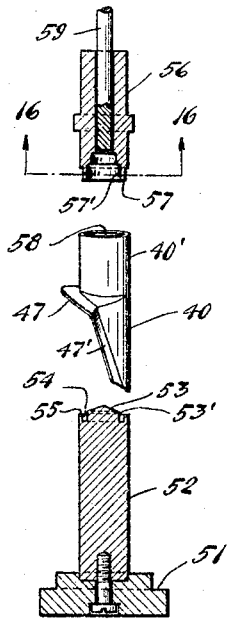
Fig. 14 is a vertical sectional view of the die used in the following step to cut an opening in the upper closed end of the tube, as indicated by the product shown in said figure.

In the succeeding operation the die shown in Fig. 14 is used for cutting an opening in the upper closed end of the tubular portion 40' of shell 40. This die includes a lower base member 51 with a post 52 secured thereto, said post being provided with a stem 53 at its upper end having a conical top and a circular cutting edge 53', and an annular groove 54 formed between said stem 53 and an outer annular flange 55. The upper movable part of said die includes a member 56 having an annular cutting flange 57 and an opening 57' formed therein, said annular flange 57 engaging in slot 54 and since the inner edge of said flange fits closely over the cutting edge 53' of stem 53 a disc is cut thereby from the upper end of tubular portion 40' leaving a desired opening 58 in said tubular portion, and while said flange 57 descends beyond cutting edge 53' into the groove 54 it carries with it the upper rim of portion 40' bending it downward over flange 55 and into groove 54.

Figure 17:
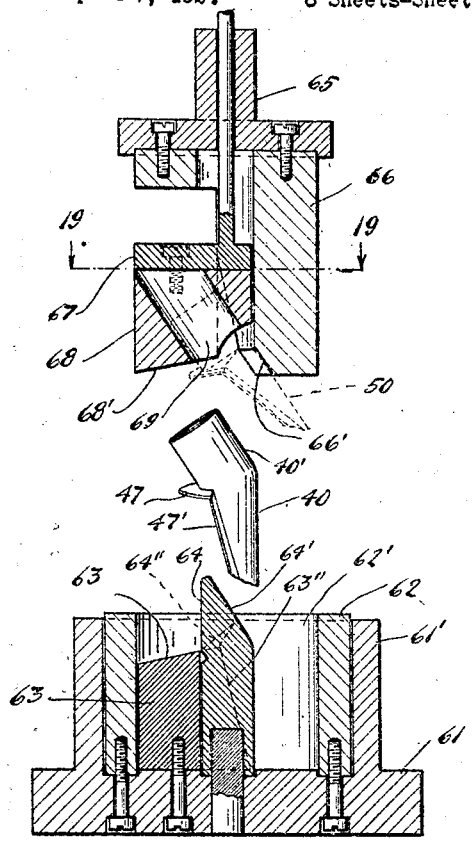
Fig. 17 shows a vertical sectional view of the die used in the succeeding operation for bending the tube, as shown in said figure.
Figure 15:
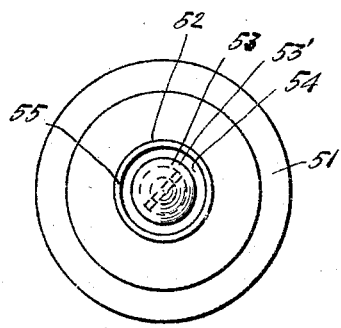
Fig. 15 is an enlarged plan view of the lower member of the die shown in Fig. 14.
Figure 16:
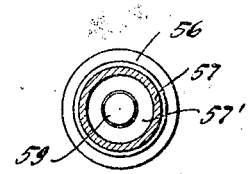
Fig. 16 is an inverted sectional view taken on line 16—16 of Fig. 14.
Figure 18:
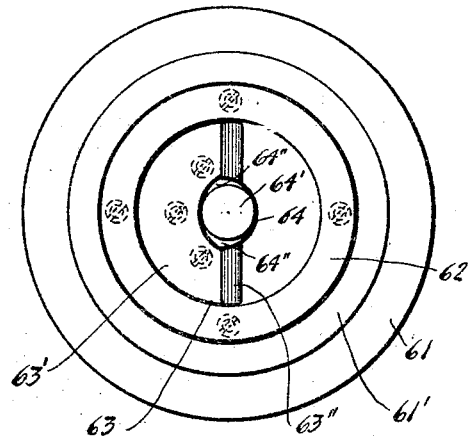
Fig. 18 is a plan view of the lower member of the die shown in Fig. 17.

The die used for the following operation includes a stationary base member 61 provided with an upstanding cylindrical flange 61' in which is mounted a sleeve 62. A semi-cylindrical die block 63 is mounted within said sleeve and is provided with an upper slanting face 63' and a pair of slanting faces 63'' extending downwardly from face 63'. A post 64 is mounted on the inner side of member 63 and is secured to the stationary member 61, a bevelled portion 64' being provided on the upper part of said post and shoulders 64'' on the side of the post. The movable die part includes an attaching member 65 to which is secured an irregular sleeve member 66 having a curved and slanting edge portion 66' on its lower inner end. A plunger 67 and a die block 68 secured thereto are slidably mounted in the central opening of member 66. A bevelled face 68' is provided on the lower side of the die block and an opening 69 is formed in said block for retaining the tubular portion 40' therein, as indicated in dotted lines in Fig. 17. As the die descends with the shell the bevelled face 68' engages flange 47 and the curved edge 66' engages the lower or flanged part of the shell 40 and gradually bends it downward with the flange 47' until said flange engages against the slanting face 63'' on block 63, and the irregular sleeve member 66 continues descending in opening 62' in sleeve 62, after face 68' and flange 47 have descended onto bevelled face 63', thereby bending downwardly the entire lower portion of shell 40.

Figure 20:
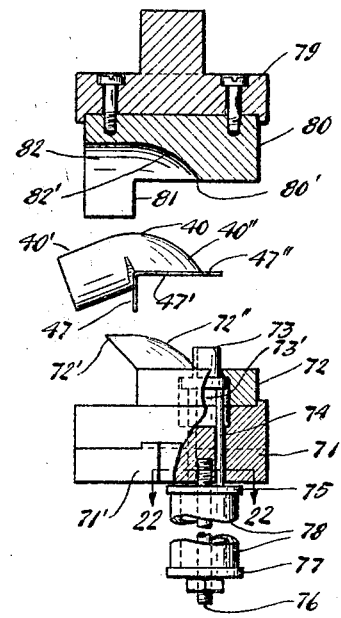
Fig. 20 is a vertical sectional view of the die used in the succeeding step for curving the flanged ends of the connector tube, as shown in said figure.
Figure 19:
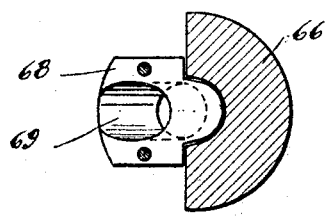
Fig. 19 is a horizontal sectional view taken on line 19—19 of Fig. 17.
Figure 21:
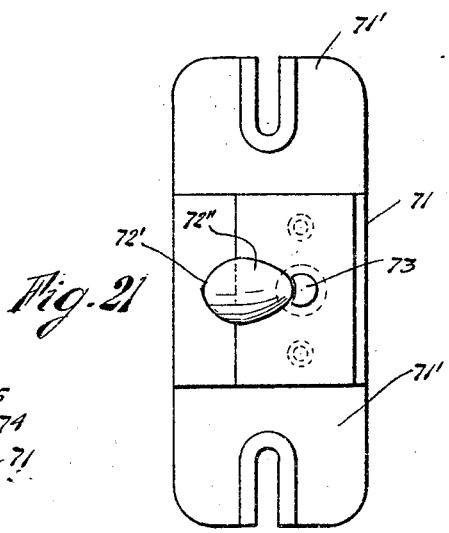
Fig. 21 is a plan view of the lower member of the die shown in Fig. 20.
Figure 22:
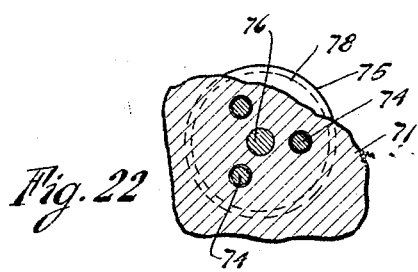
Fig. 22 is a horizontal sectional view taken on line 22—22 of Fig. 20.

In the next operation the die illustrated in Fig. 20 is used for curving the flange portion and completing the flange. This die includes a base member 71 having slotted lateral fastening flanges 71', and to said base member is secured a die block 72 provided with a curved upstanding lug 72' having a curved shoulder 72''. A stem 73 is mounted to move in a chamber 73' formed in lug 72 and base member 71, and pins 74 are extended from the lower end of said stem down to a disc 75 beneath base 71. A rod 76 is threaded into base member 71 and carries a disc 77 by means of a suitable nut, and has a resilient post 78, of rubber or the like, mounted between said discs 77 and 75. The upper part of the die includes an attaching member 79 to which is secured a die block 80 having downwardly extending portions 81 and a circular opening 82 formed therebetween and provided with a curved inner portion 82'. The connector tube is pressed on the lug 72', and as the movable members 79 and 80 of the die descend the edge 80' of member 80 engages the lower end of shell 40 and presses it upon the top of stem 73, said stem gradually and yieldingly descending with the pins 74 and disc 75 thereby compressing resilient post 78. This gradual and yielding movement downward of the outer end of the flanged portion 40 thus permits the gradual and even extending of the metal of said portion 40 to curve it gradually between the curved portion 72'' of lug 72' and the curved portion 82' of block 80, to form the curved part 40'' on the connector tube; and during this operation the flange portion 47'' is also formed to complete the flange 47' which extends substantially longitudinally of the connector tube, and these flange portions are thereby pressed substantially at right angles to the flange portion 47, in order to fit the corner of an automobile radiator. By this operation, due to the resilient movement of the stem 73 with the block 78, the curved portion 40" and the flanges are completed and properly and smoothly formed without wrinkling or cracking the metal.

In addition to the dies so far described and used in the preceding steps for producing the connector tube shown in Fig. 20, we preferably also provide dies for neatly trimming off the edges of the flanges, and for providing a drain port in said tube. The die for trimming the flanges is illustrated in Fig. 23 and includes a base member 84 to which is secured a die block 85 provided with a curved lug 85' and a semi-circular ledge 85" extending horizontally from said lug. The die also includes a member 87 attachable to the movable die-jaw and a block 88 secured thereto and provided with a cutting edge 88' forming a curved slot 89 closely fitting around the edge of block 85 to shear off the outer or uneven portion 86 from the flanges 47' and 47", to provide the neatly finished product shown in Fig. 27. A guide member 90 is preferably also secured to base member 84 to retain die block 88 against block 85.

Figure 28:
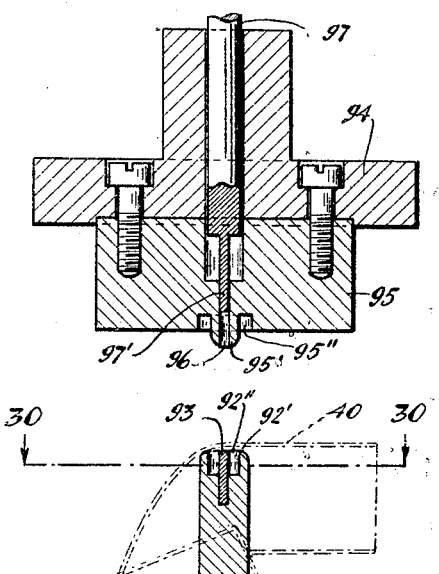
Fig. 28 shows a vertical sectional view of the die used in the succeeding operation, including the lower stationary member and the upper movable member, for forming the flanged drain port on the connector tube.
Figure 30:
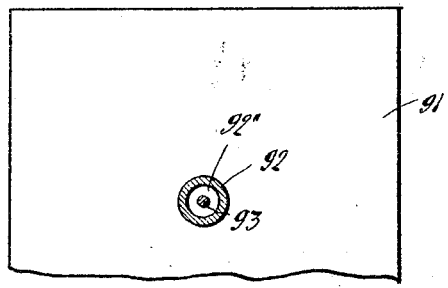
Fig. 30 is a partial sectional view taken on line 30—30 of Fig. 28.
Figure 29:
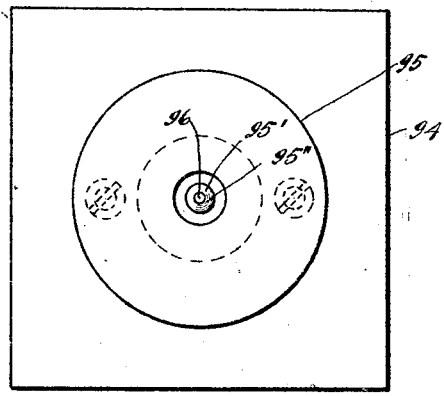
Fig. 29 is an inverted view of the upper member of the die shown in Fig. 28.

The die provided for forming the drain port in the tube is illustrated in Fig. 28, and comprises a base member 91 upon which is secured a post 92 provided with an annular cutting flange 92' within which is mounted a pin 93 forming an annular groove 92" between it and flange 92'. The die further includes a member 94, attachable to the movable die-jaw, to which is secured a die block 95 provided with a stem 95' and an annular groove 95" around the same, a central opening 96 being formed in said stem, and a plunger 97 is provided with a finger 97' to move in opening 96. The connector tube is placed in the position shown in dotted outline in Fig. 20, as the upper part of the die descends the pin 93, entering in opening 96, removes a small disc from the connector tube for an opening 98, the bevelled cutting edge 95' forcing the edges around said opening downward into annular slot 92" thus forming the flange 98' for the drain port on the connector tube, and the annular flange 92' on post 92 moves into slot 92" and forms the annular ridge 98" around the drain port on the connector tube, thus providing the product shown in Figs. 31 and 32. Any suitable die may also be provided for forming a bead or annular ridge around the tubular portion adjacent its end, for securely attaching a hose member thereon.

It is apparent from the above disclosure that we have provided a set or series of dies for drawing a blank of sheet metal into a neat and smoothly finished connector tube which is entirely seamless and is free from cracks or wrinkles, and which is provided with flanges adapting the tube to be mounted on the water chamber of an automobile radiator; and it is also apparent that the dies of our invention may be readily employed for forming various smooth seamless tubes of a similar nature.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. Mechanism for forming flanges on a tubular member having an extended lower portion, said mechanism including a stationary part with an irregular sleeve having an upper bevelled face portion and face portions extending downwardly therefrom, also a post mounted on said stationary part and extending between and above said face portions, said mechanism further including a movable part having an irregular sleeve with slanting face portions corresponding to the face portions on the first named sleeve, for forming outwardly extending flanges on said lower portion.

2. Mechanism for curving a tube having flanges at one end, said mechanism including a stationary part having a member with inclined faces to fit said flanges, also a post with a bevelled upper end mounted against said member, said mechanism further including a movable part having an irregular sleeve and a plunger mounted in said sleeve and provided with a slanting opening therethrough and a bevelled lower face portion, said opening being arranged to receive the tubular portion of the tube and said plunger and sleeve being arranged to descend and bend the flanged portion of said tube on said post.

3. In mechanism for making a seamless connector tube, die means for shaping flanges and for curving the flanged portion of a shell, said means including a stationary member with a die block and a stem provided with yieldable means for movably mounting it in said block and member, a curved lug on said block slanting downward towards said stem, said die means also including a movable block having a curved opening to fit said curved lug, and having a portion to engage the end of said shell and press it upon said stem and therewith gradually downwardly to complete drawing the flanges and to curve the flanged end over said lug.

4. In mechanism for making a seamless connector tube, die means for forming a flanged drain port in said tube, and including a stationary post with an annular cutting flange and a pin mounted centrally therein and extending to the top of said cutting flange, said means also including a movable die block with a cutting stem having an opening therein for receiving said pin and having a cutting edge surrounding said opening and being dome-shaped outwardly from said edge, and an annular groove formed around the dome-shaped portion to receive the annular cutting flange of said post, for forming a flanged drain opening.

5. Die means for making a seamless connector tube, said means comprising a stationary member provided with an integral sleeve and a stem secured therein, a ring closely fitting around said stem, means including a pliable post for yieldably supporting said ring; and a movable member including a cylindrical flange closely fitting around said stem and within said sleeve for engaging a blank of sheet metal placed on said ring to draw said blank downward over said stem into the form of a cap, said cylindrical flange being provided with a plunger for expelling said tubular member.

6. Die means for making a seamless connector tube, comprising a stationary member with an upstanding sleeve, an irregular sleeve with an upper and connected downwardly bevelled face portions mounted in the first sleeve, a stem mounted in said irregular sleeve being provided with shoulders adjacent said face portions; and a movable member carrying an irregular sleeve having bevelled faces to co-operate with the bevelled faces on the first said irregular sleeve and having shoulders to co-operate with the shoulders on said stem, for forming flanges and bevelled shoulders on a connector tube.

7. Die means for making a seamless connector tube, comprising a stationary member with an upstanding sleeve, an irregular sleeve mounted in the first sleeve and having a bevelled upper face portion and slanting face portions descending therefrom, a stem mounted in said irregular sleeve and being provided with shoulders at the junctions of said face portions; a movable member carrying an irregular sleeve having bevelled faces to co-operate with the bevelled faces on the first said irregular sleeve and having shoulders to co-operate with the shoulders on said stem, for forming end flanges and bevelled shoulders on a connector tube; and a plunger mounted in the second irregular sleeve for expelling the connector tube.

8. Die means for making a seamless connector tube, said means comprising a stationary member provided with a sleeve, a semi-cylindrical member mounted therein and having a slanting face on its upper end and slanting edge faces extending oppositely downwardly therefrom, a stem mounted in said semi-cylindrical member and provided with a bevelled upper face; and a movable part including an irregular sleeve with a bevelled lower portion, and a plunger with a die block slidably mounted in the sleeve and provided with a bevelled lower portion to fit the bevelled faces on said cylindrical member and having a slanting opening for receiving a flanged tube, said sleeve and block being arranged and their lower portions bevelled to bend said tube and flanges on said stem and bevelled faces.

9. Die means for making a seamless connector tube, comprising a stationary member provided with a die block and a curved lug mounted thereon, a stem movably mounted in said block and extending above the same, pliable means for yieldably supporting said stem above said block; and a movable die block provided with a curved portion and a horizontal portion, said curved portion being arranged to co-operate with the curved lug and shape, a curved elbow on said tube, and said horizontal portion being adapted to gradually draw the end of the curved elbow downward between it and said stem and press the tip end onto the die block to complete a flange on the end of said curved elbow during the curving of said tube.

In testimony whereof we have signed our names to this specification in the presence of two subscribing witnesses.

WILLIAM NATHANSON.
JACK BEHM.

Witnesses:
　FREDA C. APPLETON,
　MARGARET AUER.